(12) United States Patent
Bao et al.

(10) Patent No.: US 12,313,497 B2
(45) Date of Patent: May 27, 2025

(54) CROSS-DOMAIN MECHANICAL FAULT DIAGNOSIS METHOD BASED ON MULTI-CHANNEL FEATURE FUSION OF CBAM AND USE THEREOF

(71) Applicant: Shandong University of Science and Technology, Qingdao (CN)

(72) Inventors: Huaiqian Bao, Qingdao (CN); Jinrui Wang, Qingdao (CN); Zongzhen Zhang, Qingdao (CN); Baokun Han, Qingdao (CN); Shuo Xing, Qingdao (CN)

(73) Assignee: SHANDONG UNIVERSITY OF SCIENCE AND TECHNOLOGY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/494,396

(22) Filed: Oct. 25, 2023

(65) Prior Publication Data

US 2024/0142342 A1  May 2, 2024

(30) Foreign Application Priority Data

Oct. 26, 2022 (CN) .......................... 202211320657.7

(51) Int. Cl.
  *G01M 13/045* (2019.01)
  *G01M 13/028* (2019.01)
  *G06F 18/25* (2023.01)

(52) U.S. Cl.
  CPC ........ *G01M 13/045* (2013.01); *G01M 13/028* (2013.01); *G06F 18/253* (2023.01)

(58) Field of Classification Search
  None
  See application file for complete search history.

(56) References Cited

U.S. PATENT DOCUMENTS

2021/0319546 A1* 10/2021 Kang .................... G06F 18/241
2024/0029402 A1*  1/2024 Cao ...................... G06V 10/454

FOREIGN PATENT DOCUMENTS

CN       108507787 A      9/2018
CN       111458148 A  *   7/2020
                (Continued)

OTHER PUBLICATIONS

Woo, Park, Lee, and Kweon, "CBAM: Convolutional Block Attention Module", (Jul. 2018) (Year: 2018).*
(Continued)

*Primary Examiner* — Lisa M Caputo
*Assistant Examiner* — Cynthia L Davis
(74) *Attorney, Agent, or Firm* — MUNCY, GEISSLER, OLDS & LOWE, P.C.

(57) ABSTRACT

A cross-domain mechanical fault diagnosis method based on multi-channel feature fusion of a CBAM and use thereof includes conducting preliminary feature extraction in a grey-scale graph formed by original signals with convolutional neural network, obtaining high-level features, and compressing the high-level features with a full-connection layer module; conducting deep-level multi-sensor feature extraction with an improved convolutional block attention module (CBAM); conducting fusion for multi-sensor features extracted with an improved convolutional block attention module and obtaining multi-sensor fusion features; and inputting the multi-sensor fusion features into a tag assignor for fault diagnosis results. In the present invention, the latest multi-channel domain adaptation fault diagnosis method is used to realize efficiently intelligent fault diagnosis tasks of bearings in different working states.

7 Claims, 2 Drawing Sheets

(56) References Cited

FOREIGN PATENT DOCUMENTS

| CN | 112304614 | A | * | 2/2021 | .......... G01M 13/045 |
|---|---|---|---|---|---|
| CN | 113673397 | A |   | 11/2021 | |
| CN | 114994426 | A |   | 9/2022 | |
| CN | 114997211 | A | * | 9/2022 | |

OTHER PUBLICATIONS

Li, Hongmei; "Research about Intelligent Fault Diagnosis Method Based on Convolutional Neural Network"; North University of China—Doctoral Dissertation; submitted May 28, 2021; Jan. 1, 2022, 141 pages.

Li, Qikang et al.; "Cross-Attribute adaption networks: Distilling transferable features from multiple sampling-frequency source domains for fault diagnosis of wind turbine gearboxes"; Measurement; Jul. 13, 2022, Issue 200, 15 pages.

Chen, Qiuyi et al.; Gear Fault Diagnosis Under Variable Load Conditions Based on Acoustic Signals, IEEE Sensors Journal; Oct. 19, 2022; p. 22344-22355; vol. 22; Issue No. 23; Dec. 1, 2022.

\* cited by examiner

CROSS-DOMAIN MECHANICAL FAULT DIAGNOSIS METHOD BASED ON MULTI-CHANNEL FEATURE FUSION OF CBAM AND USE THEREOF

TECHNICAL FIELD

The present invention relates to the technical field of mechanical fault data recognition, and especially a cross-domain mechanical fault diagnosis method based on multi-channel feature fusion of CBAM and use thereof.

BACKGROUND TECHNOLOGY

Rotating mechanical devices are always crucial parts of mechanical devices, it is usually not easy to notice early faults of the rotating mechanical devices, and when discovered, the faults of the rotating mechanical machineries often bring certain losses to production benefits of the machineries, and in worse cases, serious hazards that may endanger personal safety may occur. For early diagnosis of the rotating mechanical parts, empirical judgment is usually employed artificially, and in this way, subjective error of the diagnosis result is inevitable and manpower is wasted to a large extent.

In recent years with the prosperous development in the field of deep learning, computers are gradually able to handle complex classification assignments. Computer vision, as a hot research direction in the field of deep learning, has attracted more and more scholars for researches and consequently, the field of computer vision has experienced unprecedented development. Subsequently, computers extend continuously to the other sciences, for example, medical science, electronic information technology, mechanical engineering etc. At present, the computer vision approaches based on deep learning can be used to assist doctors in diagnosis to some extent; and in the electronic information field, computer vision algorithms are frequently used to fault diagnosis. In the field of mechanical engineering, the technical integration with the computer vision algorithms based on deep learning have become more and more frequently recently. Currently the mechanical fault diagnosis algorithms proposed by many researchers can be used to realize high precision fault diagnosis of specific devices in specific conditions.

With the gradual development of the intelligent fault diagnosis methods of mechanical devices based on deep learning, a lot of problems appeared. Among them, the most significant one is that for most of the algorithms accurate diagnosis can only be made based on the specific working conditions, once the working conditions of the equipment are changed, it is hard for the algorithms to make accurate judgment, which establishes that, most of the intelligent fault diagnosis algorithms currently available have poor generalization abilities. And with the increase of physical conditions of the devices, it is generally necessary to increase parameters of the algorithms adaptively, however, this will make the algorithm models to be very big, the diagnosis efficiencies will be reduced substantially, and higher requirements are posed on the computer devices.

Transfer learning offers a solution to improve the universality of the algorithm. Tagged knowledge in the source domain is used to learn untagged knowledge in the target domain. In this way, the generalization ability of the model is greatly improved. However, a new problem is brought by transfer learning, that is, negative transfer learning, wherein the transfer learning model may learn "overdue" in the target domain during training, and the diagnosis precision of the model is significantly reduced. And this has been a primary problem that transfer learning algorithms face at the moment.

By the foregoing analysis, it is learned that problems and defects with the prior art are that: in the prior art, it is difficult to make efficient diagnosis for faults of rotating mechanical parts in different working conditions and features of data information obtained is not sufficient.

SUMMARY OF THE INVENTION

To overcome the problems existing in the prior art, embodiments disclosed in the present invention provide a cross-domain mechanical fault diagnosis method based on multi-channel feature fusion of a CBAM, wherein the method comprises:

S1: conducting preliminary feature extraction in a grey-scale graph formed by original signals with convolutional neural network, obtaining high-level features, and compressing the high-level features with a full-connection layer module;

S2: conducting deep-level multi-sensor feature extraction with an improved convolutional block attention module (CBAM);

S3: conducting fusion for multi-sensor features extracted with an improved convolutional block attention module and obtaining multi-sensor fusion features; and S4: inputting the multi-sensor fusion features into a tag assignor for fault diagnosis results.

In an embodiment, in the step S1, conducting preliminary feature extraction in the grey-scale graph formed by the original signals with a convolutional neural network, obtaining the high-level features and compressing the high-level features with the full-connection layer module comprises specifically the following steps:

(1) obtaining bearing vibration signals under different working conditions and health states by experiments on a test platform;

(2) conducting aligned equal distance sampling for the obtained multi-sensor bearing vibration signals, and building a tagged source domain dataset and an untagged target domain dataset;

(3) using signals in a temporal domain as an input of a cross-domain mechanical fault model based on multi-channel feature fusion of the CBAM, wherein data of the signals in the temporal domain are aligned to be a grid as per a principle of row-major.

In an embodiment, in the step (1), obtaining the bearing vibration signals under different working conditions and health states, wherein a sampling frequency is 12800 Hz;

In the step (2), obtaining the untagged target domain dataset by not generating a tag set for target domain data.

In an embodiment, in the step S2, extracting deep-level multi-sensor features with the improved convolutional block attention module, comprising, building a multi-sensor feature extractor with a multi-channel convolutional neural network, a fully connected layer and the convolutional block attention module.

Exemplarily, conducting deep-level multi-sensor feature extraction with the improved convolutional block attention module comprises conducting feature extraction in signal space by features of a local receptive field of a convolutional neural network and acquiring features of the signal space. Converting the features extracted by the convolutional neural network into one-dimensional data and inputting the one-dimensional data into the full-connection layer can help to acquire corresponding features of time series signals. Finally conducting deep extraction and fusion for signal features with the improved convolutional block attention module.

In an embodiment, in the step S3, obtaining the multi-sensor fusion features comprises the following steps:

1) conducting classification of health states to the multi-sensor features by a tag assignor, judging fault diagnosis performance in the source domain and the target domain via cross-entropy loss; wherein a function of the cross-entropy loss is:

$$L_C(x^s, y^s) = \frac{1}{n}\sum_{i=1}^{n^s}\sum_{k=1}^{K} 1(y_i^s = k) \cdot \log C(F(x_i^s))_k \quad (1)$$

wherein, $1(y_i^s=k)$ is an indicator function, $c(F(x_i^s)_k)$ is a kth value as predicted, and k is a number of health classification;

2) conducting parallel extraction for features of different sensors by a multi-channel feature extractor, obtaining multi-sensor fusion features, and adopting a sequence of the convolutional neural network, the full-connection layer neural network and the final CBAM multi-sensor feature fusion module as a sequence of the feature extraction module;

$$M(F) = \sigma(W_1(W_0(F_{avg}^c))) + W_1(W_0(F_{max}^c)) + \sigma(f^{n \times n}[F_{avg}^s; F_{max}^s]) \quad (2)$$

wherein, $\sigma$ is a sigmoid activation function, W is a weight of the full-connection neural network, and $f^{\wedge}(n \times n)$ is a convolutional operation with a convolutional kernel of n×n. In an embodiment, in the step S4, inputting the multi-sensor fusion features into a tag assignor and obtaining the fault diagnosis result, comprising, conducing global feature alignment for cross-domain features employing Wasserstein distance after completing extraction of the multi-sensor fusion features, and realizing cross-domain signal feature transfer learning in combination with a domain adaption mechanism.

In an embodiment, conducting global feature alignment for the cross-domain features employing Wasserstein distance and realizing cross-domain signal feature transfer learning in combination with the domain adaption mechanism comprises the following steps:

(i) aligning different domain features utilizing a domain adversarial mechanism:

$$L_D = \frac{1}{n^s}\sum_{i=1}^{n^s} E_{x^s \sim p_r} D(F(x_i^s)) + \frac{1}{n^t}\sum_{j=1}^{n^t} E_{x^t \sim P_g} D(F(x_j^t)) \quad (3)$$

(ii) learning domain-invariant features with a domain difference assessment block, aligning the multi-sensor features of the health states of different devices, alleviating domain differences and outputting aligned loss, as per a following equation:

$$L_{wd} = \left| \frac{1}{n^s}\sum_{i=1}^{n^s} h_i^s - \frac{1}{n^t}\sum_{i=1}^{n^t} h_j^t \right| \quad (4)$$

wherein $h_i^s$ and $h_j^t$ are output of the feature extractor;

(iii) combining the equation (1), the equation (2), the equation (3) and the equation (4) and obtaining a total loss function as following:

$$L(\theta_F, \theta_C, \theta_D) = \gamma L_C + \beta L_{wd} + \lambda L_D \quad (5)$$

in the function, $\gamma$, $\alpha$ and $\beta$ are respectively weighting parameters of balanced loss $L_C$, $L_{wd}$ and $L_D$;

(iv) testing process: inputting test data in the target domain into a cross-domain mechanical fault model based on multi-channel feature fusion of the CBAM and outputting classification results.

Another purpose of the present invention is to provide a test platform, wherein the test platform is configured to implement the cross-domain mechanical fault diagnosis method based on multi-channel feature fusion of CBAM, wherein the test platform comprises at least one motor, at least one transmission shaft, at least one bearing seat, at least one loading device and at least one planetary gear box; and the test platform is configured to acquire vibration signals and acoustic signals under different working conditions of bearings in different health states and make intelligent fault diagnosis.

Another purpose of the present invention is to provide a computer device, wherein the computer device comprises a storage memory and a processor, a computer program is stored in the storage memory, and the computer program when executed by the processor will have the processor to execute the cross-domain mechanical fault diagnosis method based on multi-channel feature fusion of CBAM.

Another purpose of the present invention is to provide a computer readable storage medium, wherein a computer program is stored in the computer readable storage medium, and the computer program when executed by a processor, will have the processor to execute the cross-domain mechanical fault diagnosis method based on multi-channel feature fusion of a CBAM.

Based on the foregoing technical solutions, advantages and positive effects of the present invention are that:

First of all, targeting at the technical problems existing in the prior art, in view of the difficulties in addressing the problem, and in tight conjunction with the technical solutions claimed in the present invention and results and data obtained during researches and development, how the technical solutions in the present invention solve the technical problem are fundamentally and profoundly analyzed and after addressing the technical problems some inventive technical effects are achieved. Specifically:

In the present invention, firstly, convolutional neural network is used to extract the grey-scale graphs composed of the original signals and obtain high-level features, further the fully connected layers are used to compress the features, thereafter, deeper level feature extraction is conducted using the improved convolutional block attention module (CBAM), and upon fusion with the multi-channel features extracted by the CBAM, the multi-sensor fusion features are obtained. Finally the fused multi-channel features are inputted into a tag assignor to obtain the fault diagnosis results. During deep level feature extraction, feature extraction modules extract features in a plurality of channels in parallel. After feature extraction, the Wasserstein distance is used to conduct global feature alignment, and realize cross-domain signal feature transfer learning to the greatest extent in conjunction with the domain adaptation mechanism. In the present invention, the latest multi-channel domain adaptation fault diagnosis method is used to realize intelligent fault diagnosis tasks for bearings in different working states.

Secondly, taken the technical solutions as an entirety or from the perspective of viewing a product, the technical effects and advantages of the technical solutions claimed in the present invention are specifically: a multi-channel feature extractor with common parameters is used to conduct deep feature extraction and fusion for signals from a plurality of sensors, in this way, the deficiency of signal information of a single sensor and with the algorithms the health states of the device cannot be diagnosed efficiently can be overcome; further, the domain adaptation mechanism is used to align features in different domains, more domain-invariant features can be extracted by the model and cross-domain fault diagnosis can be avoided.

Simulation experiments showed that, compared with the bearing data disclosed by Case Western Reserve University the present invention owns more rotation velocity states, and can be used to test the diagnosis ability of a model in more working conditions.

Thirdly, auxiliary evidence of the inventiveness of the claims of the present invention is shown herein:
(1) Expected benefit and commercial values of the present invention after transformation in industries are: with the cross-domain fault diagnosis method utilizing multi-sensor signals efficient fault diagnosis of rotating parts can be done, and the liability of a single sensor to disturbance and information insufficiency are compensated. The fault of a part can be detected before occurrence of an apparent fault and unnecessary loss can be avoided.
(2) The technical solutions of the present invention have filled the technical gap in the technology in China and abroad; and a new solution for fault diagnosis of a device is provided. And multiple sensors are used to realize cross-domain fault diagnosis.
(3) The technical solutions of the present invention have addressed the technical problems that demand solution in vain for a long time; and by improving the CBAM deep fusion of multi-channel signals is realized and more multi-channel signals and features are extracted and more accurate cross-domain fault diagnosis can be realized.

BRIEF DESCRIPTION OF DRAWINGS

The drawings given here are incorporated into the description and form a part of the present description, show the embodiments of the present disclosure and are intended to explain the principles of the present disclosure jointly with the description.

EMBODIMENTS

To make the purposes, characteristics and advantages of the present invention more clear, hereinafter a detailed description will be given to the embodiments of the present invention in conjunction with the drawings. In the following description many specific details are set forth to facilitate full understanding of the present invention. However, the present invention can be realized in a plurality of ways other than those described here, and those of ordinary skill in the art can make similar improvements without departing from the essence of the present invention, therefore, the present invention is not limited by the following specific embodiments.

I. EXPLANATORY AND ILLUSTRATIVE EMBODIMENTS

Figure 1:
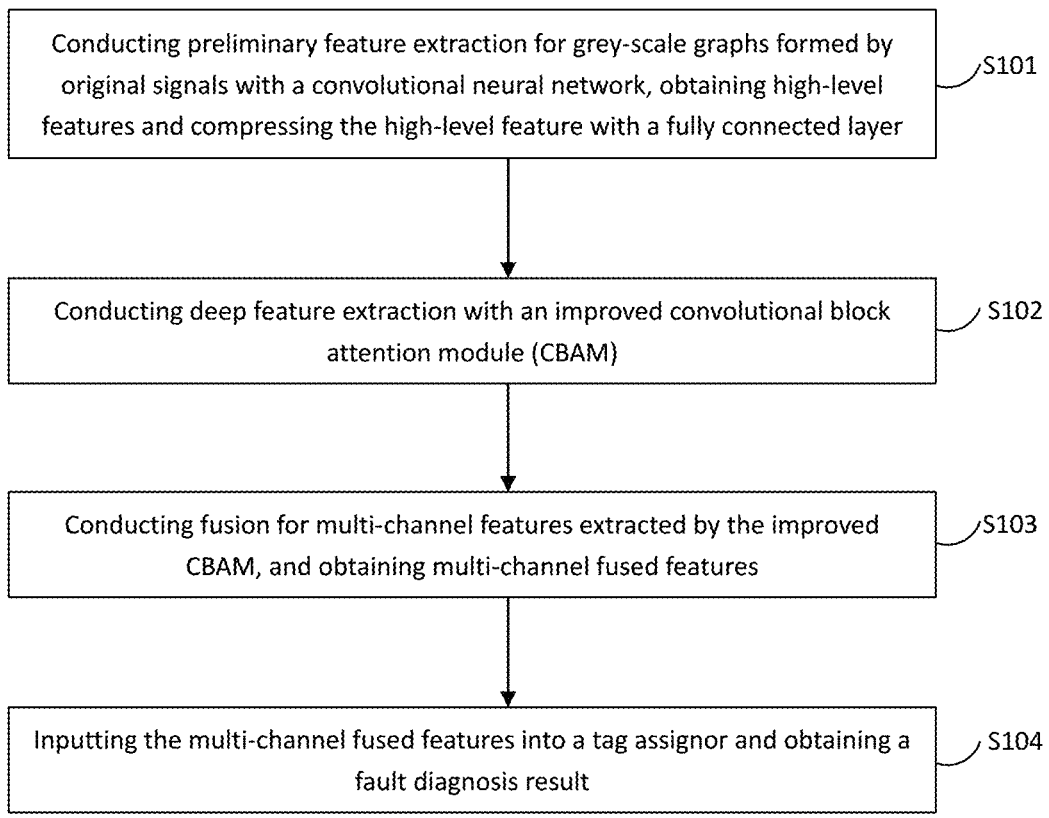
FIG. 1 is a flowchart diagram showing a cross-domain mechanical fault diagnosis method based on multi-channel feature fusion of a CBAM provided in an embodiment of the present invention.

As shown in FIG. 1, an embodiment of the present invention provides a cross-domain mechanical fault diagnosis method based on multi-channel feature fusion of a CBAM, wherein the method comprises the following steps:
S101, conducting preliminary feature extraction for grey-scale graphs consisting of original signals with a convolutional neural network, obtaining high-level features, and compressing the high-level features with a fully connected layer;
S102, conducting deep level feature extraction with an improved convolutional block attention module (CBAM);
S103, fusing multi-sensor features extracted by the CBAM, and obtaining multi-sensor fused features; and
S104, inputting the multi-sensor fused features into a tag assignor and obtaining a fault diagnosis result.

In an embodiment of the present invention, during deep level feature extraction, at least one feature extraction module is employed to extract features through multiple channels in parallel.

Wherein, conducting deep level multi-sensor feature extraction with the CBAM is done by extracting multi-sensor features, extracting characters of local receptive fields of the convolutional neural network to extract features of signal space and obtain the features of the signal space. By converting the feature extracted by convolutional neural network into one-dimensional data and inputting the same into a fully connected layer for treatment, corresponding features relating to time series signals can be obtained. Finally the CBAM is used to conduct deep extraction and fusion of the signal features.

After completing feature extraction, conducting global feature alignment for cross-domain features employing Wasserstein distance, and realizing transfer learning of cross-domain signals and features to the greatest extent in conjunction with a domain adaptation mechanism.

Embodiment 1

An embodiment of the present invention provides a cross-domain mechanical fault diagnosis method based on multi-channel feature fusion of a CBAM, wherein the method comprises the following steps:
(1) Obtaining vibration signals and acoustic signals of at least one bearing in different working conditions and different health states in a test platform, wherein a sampling frequency is 12800 Hz, and compared with conventional individual sensor fault diagnosis, with the present multi-sensor fault diagnosis method, the problem of deterioration of fault diagnosis accuracy due to damages or interference of the individual sensor is avoided.
(2) Conducting aligned evenly spaced sampling for the vibration signals and the acoustic signals of the at least one bearing obtained with the multiple sensors to promise that both samples of the vibration signals and samples of the acoustic signals are extracted simultaneously, building a tagged source domain dataset and an untagged target domain dataset, realizing training of a cross-working condition transfer learning model and improve a generalization ability of the algorithms.

(3) Utilizing temporal domain signals as an input of the cross-domain mechanical fault model based on multi-channel feature fusion of CBAM, and formatting the temporal domain data to be a matrix as per a row-major principle. Compared with the method of extracting manually the features of the original signals and inputting into the model for training, by using the initial temporal domain signals the influence due to manual feature extraction can be eliminated and configuring the data in the matrix a feature extraction capacity of the convolutional neural network can be fully utilized.

(4) Building the multi-sensor feature extractor with the multi-channel convolutional neural network, the fully connected layer and the CBAM. Compared with commonly used fully connected layer feature extractor, the ability to extract and express invariant features is improved, deep fusion of the multi-sensor signals and features is realized and the robustness of the algorithms is enhanced.

(5) Conducting health state classification for the multi-sensor fusion features with the tag assignor, and assessing source domain and target domain fault diagnosis performance by cross-entropy loss. During training, using fully a loss function to counter-propagate a renewed model, and improve recognition ability of different health states of a device. The loss function is as following:

$$L_C(x^s, y^s) = \frac{1}{n}\sum_{i=1}^{n^s}\sum_{k=1}^{K} l(y_i^s = k) \cdot \log C(F(x_i^s))_k \quad (1)$$

Wherein $l(y_i^s=k)$ is an indicator function, $C(F(x_i^s))_k$ is a kth value as predicted in the distribution, and k is a number of healthy classes.

(6) Conducting parallel extracting for features from different sensor in multi-channels, obtaining the multi-sensor fusion feature, and adopting a feature extraction sequence of convolutional neural network, fully connected neural network, and final CBAM multi-sensor feature fusion module. Compare with simple weighted fusion of the multi-sensor signals and features, the multi-sensor signals and features are deeply fused based on the CBAM, and the robustness of the algorithms is improved.

$$M(F)=\sigma(W_1(W_0(F_{avg}^c)))+W_1(W_0(F_{max}^c))+\sigma(f^{n \times n}[F_{avg}^s; F_{max}^s]) \quad (2)$$

Wherein, σ is a sigmoid activation function, W is a weight of the fully connected neural network, f̂(n×n) is a convolution operation with a size of the convolutional kernel to be n×n;

(7) Aligning the features in different domains utilizing the domain adaptation mechanism, so that the algorithms can recognize the features in different domains fully, and cross-domain recognition can be realized:

$$L_D = \frac{1}{n^s}\sum_{i=1}^{n^s} E_{x^s \sim p_r} D(F(x_i^s)) + \frac{1}{n^t}\sum_{j=1}^{n^t} E_{x^t \sim P_g} D(F(x_j^t)) \quad (3)$$

(8) Learning domain-invariant features with a domain difference assessment block, aligning the multi-sensor features of devices in different health conditions, alleviating domain discrepancy and outputting alignment losses, and compared with the domain alignment algorithms by only including the domain adaptation mechanism, the ability of the algorithms to make cross-domain recognition is further improved, as shown in the following equation:

$$L_{wd} = \left|\frac{1}{n^s}\sum_{i=1}^{n^s} h_i^s - \frac{1}{n^t}\sum_{i=1}^{n^t} h_j^t\right| \quad (4)$$

Wherein, $h_j^s$ and $h_j^t$ are outputs of the feature extractor.

Embodiment 2

Figure 2:
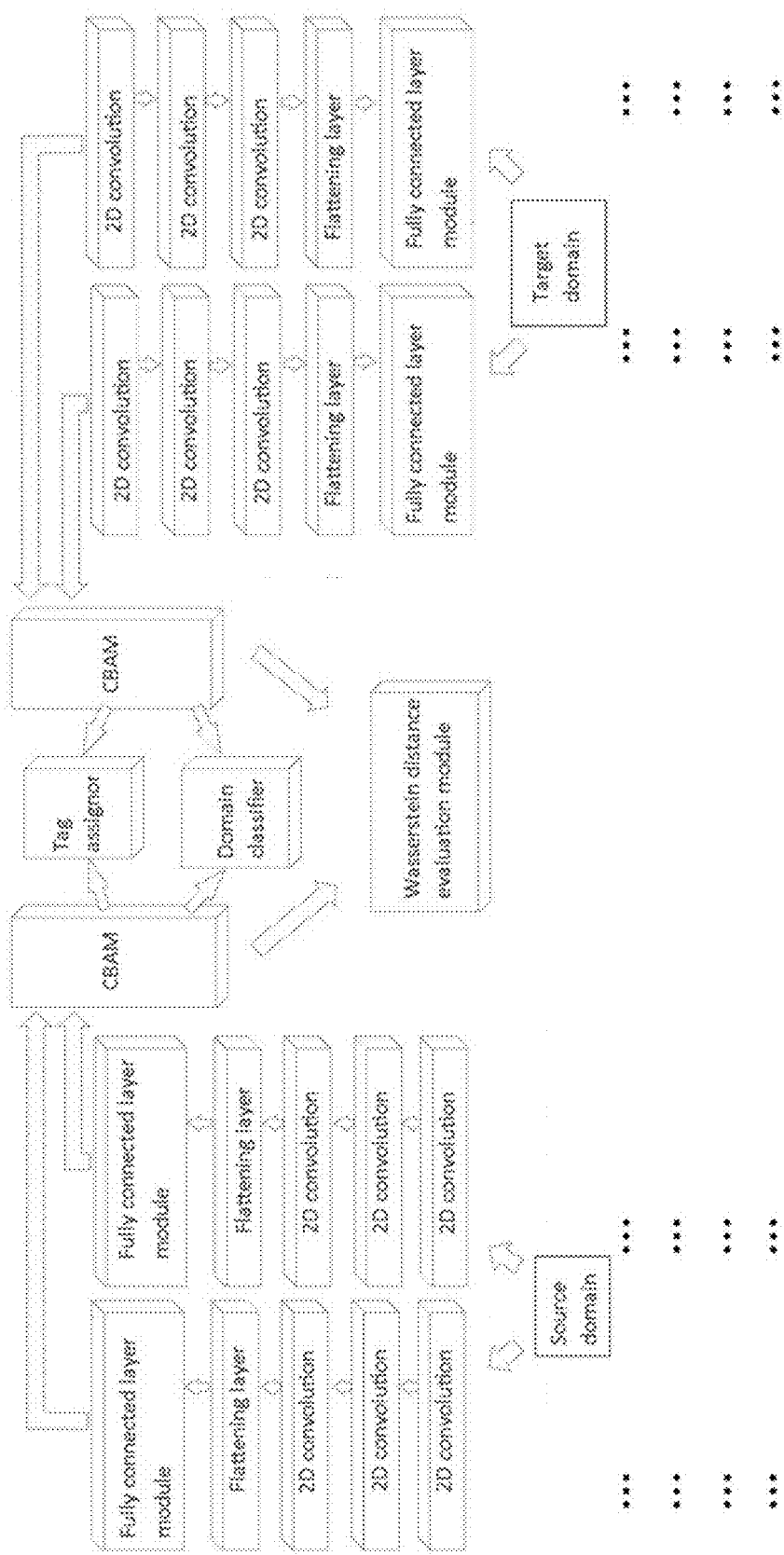
FIG. 2 is a schematic diagram showing the cross-domain mechanical fault diagnosis method based on multi-channel feature fusion of the CBAM provided in an embodiment of the present invention

As shown in FIG. 2, the cross-domain mechanical fault diagnosis method based on multi-channel feature fusion of a CBAM proposed in the present invention comprises the following steps:

(1) Obtaining vibration signals of at least one bearing in different working conditions and different health states by testing on a test platform, wherein a sampling frequency is 128000 Hz, and compared with the conventional single sensor signal fault diagnosis method, with the multi-sensor fault diagnosis method, the deterioration of the fault diagnosis accuracy due to damage or interference of the individual sensor can be avoided. The bearing used in the test platform has five health states. The five health states comprise inner race fault 0.2 mm (IF0.2), outer race fault 0.2 mm (OF0.2), outer race fault 0.4 mm (OF0.4), inner race fault 0.4 mm (IF0.4) and normal condition (NC), and all five bearing faults are caused by electric discharge machining. Totally five working conditions are set: 1300 rpm (S1), 1500 rpm (S2), 1800 rpm (S3), 2000 rpm (S4) and 2200 rpm (S5).

(2) Conducting aligned evenly spaced sampling for the multi-sensor bearing vibration signals obtained, building a tagged source domain dataset by generating a tag set for the device health states represented by the source domain data, however, an untagged target domain dataset is not generated by generating a tag set for the target domain data.

(3) Utilizing the temporal domain signals as an input of the model, and configuring the temporal domain signal data to be a row-major array. Compared with the method of training models by extracting features of the original signals manually and inputting the same into the model for training, by utilizing the original temporal domain signals influences due to manual features can be eliminated, and by configuring the data to be an array the feature extraction ability of the convolution neural network can be fully played.

(4) Building a multi-sensor feature extractor with a multi-channel convolutional neural network, the fully connected layer and the CBAM. Compared with the commonly used fully connected layer feature extractor, the ability to extract and express invariant features is improved, deep fusion of the multi-sensor signal features is realized and the robustness of the algorithm is improved.

(5) Conducting health state classification for the multi-sensor fusion features with a tag assignor, wherein the tag assignor comprises two layers of fully connected layers, and unit numbers of the two fully connected layers are respectively 100 and 5, activating via the Relu function, and the final output obtained after neural network calculation of the two fully connected layers are consequently classes of the health states of the device according to the tag assignor, and measuring the fault diagnosis performance of the source domain and the target domain by a cross entropy loss of the classification results of the model. During training, using fully the loss function to back propagate and update the model, and improving recognition ability of the model to the device in different health states. Wherein the loss function is:

$$L_C(x^s, y^s) = \frac{1}{n}\sum_{i=1}^{n^s}\sum_{k=1}^{K} l(y_i^s = k) \cdot \log C(F(x_i^s))_k \quad (1)$$

Wherein, $l(y_i^s - k)$ is an indicator function, $C(F(x_i^s))_k$ is a kth value as predicted in the distribution, and k is a number of healthy classes.

(6) Acquiring multi-channel fusion features by extracting in parallel features of different sensors in multiple channels, adopting a sequence of the feature extraction module to be convolutional neural network, fully connected layer neural network and finalized CBAM multi-sensor feature fusion module. And compared with simple weighted fusion of the multi-sensor signals and features, the robustness of the algorithm based on deep fusion of the multi-sensor signals and feature of CBAM is improved.

$$M(F) = \sigma(W_1(W_0(F_{avg}^c))) + W_1(W_0(F_{max}^c)) + \sigma(f^{n \times n}[F_{avg}^s; F_{max}^s]) \quad (2)$$

Wherein, σ is a sigmoid activation function, W is a weight of the fully connected layer neural network, f^(n×n) is a convolution operation with a size of a convolution kernel n×n;

(7) Aligning features in different domains by domain adaptation mechanism, having the algorithm recognizing the features in different domains and realizing cross-domain recognition:

$$L_D = \frac{1}{n^s}\sum_{i=1}^{n^s} E_{x^s \sim p_r} D(F(x_i^s)) + \frac{1}{n^t}\sum_{j=1}^{n^t} E_{x^t \sim P_g} D(F(x_j^t)) \quad (3)$$

(8) Learning domain-invariant features by a domain difference measuring block, aligning the multi-sensor features of different health states of the device, relieving domain difference and outputting aligned loss, compared with domain alignment algorithm by simply adding the domain adaptation the cross-domain recognition ability of the algorithm is further improved, as shown here:

$$L_{wd} = \left| \frac{1}{n^s}\sum_{i=1}^{n^s} h_i^s - \frac{1}{n^t}\sum_{i=1}^{n^t} h_j^t \right| \quad (4)$$

Wherein $h_j^s$ and $h_j^t$ are outputs of the feature extractor.

(9) Combining the equation (1), the equation (2), the equation (3) and the equation (4) and obtaining the total loss function as following:

$$L(\theta_F, \theta_C, \theta_D) = \gamma L_C + \beta L_{wd} + \lambda L_D \quad (5)$$

In the equation, γ, α and β are respectively evaluating parameters of balanced loss $L_C$, $L_{wd}$ and $L_D$.

(10) During test: inputting the test data of the target domain into the cross-domain mechanical fault diagnosis model based on multi-channel feature fusion of the CBAM and outputting classification results.

in the foregoing embodiments, description of each embodiment has different emphases, for parts not elaborated on in an embodiment the corresponding description in the other embodiments can be used.

Contents with regard to information interaction and execution processes of the foregoing devices and units, specific functions and technical effects thereof have not been set forth repeatedly here as they are based on the same idea as the method embodiments of the present invention, and for the specific contents please refer to the method embodiments. Those skilled in the art can readily appreciate that, for ease and simplicity of description, exemplary description is given to division of the functional units and modules, and during actually application, the foregoing function assignments can be realized by different functional units and modules as required, that is, the internal structures of the device can be divided to be different functional units or modules to complete all or some of the functions set forth in the foregoing paragraphs. The functional units and modules can be integrated in a processing unit, or the units can exist physically alone, or two or more units can be integrated in a unit, and the integrated unit can be realized in the form of hardware or in the form of software function unit. Furthermore, specific titles of the functional units and modules are given to differentiate each other, rather than to limit the protection scope of the present invention. And for the specific working processes of the units and modules in the system the corresponding processes in the foregoing method embodiments can be referred to and the description will not be repeated here.

II. APPLICATION EMBODIMENTS

Application Embodiment 1

The cross-domain mechanical fault diagnosis method based on multi-channel feature fusion of a CBAM as provided in the embodiments of the present invention can be used in cross working condition fault diagnosis for common revolution mechanical parts, for example, engine gearboxes, bearings and motors, and the method can be used in circumstances where a plurality of sensors are deployed to acquire signals of the device.

Application Embodiment 2

The embodiments of the present invention further provide a computer device, wherein the computer device comprises: at least one processor, a storage memory, and a computer program stored in the storage memory and can be run by the at least one processor, and the at least one processor executes the computer program to execute steps in the foregoing method embodiments.

Application Embodiment 3

The embodiments of the present invention provide a computer readable storage medium, wherein the computer readable storage medium is stored with a computer program, and the computer program when executed by a processor will execute the steps in the foregoing method embodiments.

Application Embodiment 4

The embodiments of the present invention further provide an information data processing terminal, wherein the information data processing terminal is configured to provide a user input interface to execute the steps in the foregoing method embodiments when executed on an electronic device, wherein the information data processing terminal is not limited to phones, computers and switches.

Application Embodiment 5

The embodiments of the present invention provide a server, wherein the server when executed on an electronic device will provide a user input interface to execute the steps in the foregoing method embodiments.

Application Embodiment 6

The embodiments of the present invention provide a computer program product, and the computer program product when executed on an electronic device, will provide a user input interface to execute the steps in the foregoing method embodiments.

The integrated units when being realized in the form of a software functional unit and being sold or used as an independent product can be stored in a computer readable storage medium. Based on this understanding, all or some of the process flows of the foregoing method embodiments can be done by having a computer program instruct the corresponding hardware, the computer program can be stored in a computer readable storage medium, and the computer program when executed by a processor can realize the steps in the foregoing method embodiments. Wherein, the computer program comprises computer program codes, and the computer program codes can be in the form of source codes, object codes, executable files or some intermediate forms. The computer readable medium at least comprises: any entity or device, recording medium, computer storage device, read-only memory ROM, random access memory RAM, electronic carrier waves, telecommunication signals and software distribution media, for example, U disk, mobile hard disks, magnetic disk, optical disk etc.

III. EVIDENCE WITH RESPECT TO EFFECTS OF THE EMBODIMENTS

Simulation Experiments

Simulation experiments were designed and bearing were selected for fault diagnosis experiments. A specially designed test platform was used and the test platform comprised a motor, a drive shaft, a bearing seat, a loading device and a planetary gear box. And the test platform was used to acquire vibration signals and acoustic signals of the bearings of different health states in different working conditions, and intelligent fault diagnosis was conducted.

Compared with the bearing data disclosed by the Case Western Reserve University our data had more vibration states, and can be used to test the diagnosis ability of the model in more working conditions.

The bearing used in the test platform had totally five health states, namely, inner race fault 0.2 mm (IF0.2), outer race fault 0.2 mm (OF0.2), outer race fault 0.4 mm (OF0.4), inner race fault 0.4 mm (IF0.4), and normal condition (NC) and all five bearing faults were machined by electric discharge machining. Five working conditions were respectively set: 1300 rpm (S1), 1500 rpm (S2), 1800 rpm (S3), 2000 rpm (S4) and 2200 rpm (S5). Therefore, five kinds of transfer tasks were done, respectively S1→S2, S1→S3, S2→S3, S3→S4, S3→S5, wherein a load of the bearing was 0 Nm. For each class of bearing fault totally 500 samples were used, respectively acceleration signal samples and acoustic signal samples, and each of the samples comprised 4096 data points.

TABLE 1

| Transfer task | Source domain | Target domain |
| --- | --- | --- |
| S1→S2 | 1300 rpm | 1500 rpm |
| S1→S3 | 1300 rpm | 1800 rpm |
| S2→S3 | 1500 rpm | 1800 rpm |
| S3→S4 | 1800 rpm | 2000 rpm |
| S3→S5 | 1800 rpm | 2200 rpm |

By comparison to a common transfer learning method and a self-designed method, the present embodiment has the best performance, therefore, the advantages of the present method are verified and the comparison method is as following.

(1) Fully connected neural network domain adversarial method: for domain adversarial method, the most common transfer learning method, the domain adversarial mechanism is introduced, the fully connected layer is used as a feature extractor, and on the premise of differentiating the source domain and the target domain to the largest extent during model training, domain invariant features of the source domain and the target domain is obtained.

(2) Domain adversarial method based on convolutional neural network: what is different from the method one is that, the convolutional neural network is used as a feature extractor, and the amount of parameters of the model is greatly reduced and so is the feature extraction ability. And what is different from the method proposed in the present invention is that, the multi-channel sensor signals have not been introduced for feature fusion with the CBAM, and the Wasserstein distance domain alignment mechanism with deep domain adaptation is neither introduced.

(3) Domain adversarial method by equal-weight fusion of multi-channel features: on the basis of the method two, the multi-channel feature extractor is introduced and equal-weight fusion of the multi-channel features is conducted.

Wherein parameters of the 2D convolution module of the feature extractor are shown in FIG. 2, and the parameters of the fully connected layer feature extractor are shown in FIG. 3. In the fault diagnosis algorithm of the present invention, three convolutional neural network modules are used to conduct preliminary feature extraction, wherein each of the convolutional modules comprises a convolutional layer, a batch normalization layer and a max pooling layer. The features extracted by the convolutional module are flattened and input into the fully connected layer feature extractor for deep feature extraction and finally the CBAM module conducts deep extraction and fusion of the multi-channel features. Wherein the values of the weighting parameters $\alpha$, $\beta$ and $\gamma$ have significant influences on the model diagnosis progress, and the weighting parameters in the model are set to be $\alpha=0,1$, $\beta=0.5$ and $\gamma=0.00005$.

Table 4 shows the diagnosis accuracy of the four methods under the five transfer tasks. By analysis the following conclusions can be reached. Compared with the other three methods, the diagnosis accuracy of the present method is far higher than that of the other algorithms. And by comparison of the method one and the method three, it is known that multi-channel signal fusion can help to improve the diagnosis accuracy of the algorithm to a certain extent for the purpose of fault diagnosis of mechanical revolution parts. And by comparison of the method three and the present method, the diagnosis accuracy of the present method is higher than the method three, which establishes that, with the present method, more abundant multi-channel signals and features and invariant features can be extracted. For difficult transfer tasks such as S1→S3 and S3→S5, the present method has good performance, and this shows that, the domain adaptation method of the present method is higher than that of the other method.

TABLE 2

| Number of layer | Type of layer | Parameter | Stride | Activation function | Padding |
|---|---|---|---|---|---|
| 1 | 2D convolution | Kernel size: 3 × 3 | 1 | Relu | Yes |
| 2 | Batch normalization | / | / | / | / |
| 3 | Max pooling | Kernel size: 3 × 3 | 2 | / | Yes |

TABLE 3

| Number | Layer type | Weights | Activation function |
|---|---|---|---|
| 1 | Dense | 8192 × 256 | Relu |
| 2 | Dense | 256 × 100 | Relu |
| 3 | Dense | 100 × 5 | Relu |

TABLE 4

| Method | S1→S2 | S2→S3 | S1→S3 | S3→S4 | S4→S5 | S3→S5 | Average accurate rate |
|---|---|---|---|---|---|---|---|
| Fully connected neural network domain adversarial method | 92.2% | 95.12% | 83.21% | 80.15% | 73.32% | 71.61% | 82.60167% |
| Convolutional neural network domain adversarial method | 99.02% | 98.32% | 71.92% | 69.03% | 77.55% | 72.15% | 81.33167% |
| Multi-channel feature equal-weight fusion domain adversarial method | 99.56% | 99.37% | 76.21% | 98.55% | 99.82% | 99.35% | 95.47667% |
| The method proposed in the present invention | 99.82% | 99.95% | 99.86% | 99.96% | 99.92% | 99.86% | 99.895% |

The foregoing are some specific preferred embodiments of the present invention, the protection scope of the present invention is not limited to these embodiments, and all modifications, equivalent replacements and improvements made to the present invention within the technical scope disclosed in the present invention and within the spirit and essence of the present invention by those skilled in the art shall be covered in the protection scope of the present invention.

The invention claimed is:

1. A cross-domain mechanical fault diagnosis method based on multi-channel feature fusion of a convolutional block attention module (CBAM), wherein the method comprises:
   S1: conducting preliminary feature extraction in a grey-scale graph formed by original signals with a convolutional neural network, obtaining high-level features, and compressing the high-level features with a full-connection layer module;
   S2: conducting fusion for multi-sensor features extracted with a convolutional block attention module and obtaining multi-sensor fusion features; and
   S3: inputting the multi-sensor fusion features into a tag assignor for fault diagnosis results;
   wherein in the step S1, conducting preliminary feature extraction in the grey-scale graph formed by the original signals with a convolutional neural network, obtaining the high-level features and compressing the high-level features with the full-connection layer module comprises specifically the following steps:
   (1) obtaining bearing vibration signals under different working conditions and health states by experiments on a test platform;
   (2) conducting aligned equal distance sampling for obtained multi-sensor bearing vibration signals, and building a tagged source domain dataset and an untagged target domain dataset;
   (3) using signals in a temporal domain as an input of a cross-domain mechanical fault model based on multi-channel feature fusion of the CBAM, wherein data of the signals in the temporal domain are aligned to be a grid as per a principle of row-major; wherein in the step S2, conducting fusion for multi-sensor features extracted with a convolutional block attention module and obtaining multi-sensor fusion features comprises:
   building a multi-sensor feature extractor with a multi-channel convolutional neural network, an fully connected layer and the CBAM, conducting parallel extraction via the multi-channel convolutional neural network and the fully connected layer; and fusing multi-sensor features extracted by the CBAM, and obtaining multi-sensor fused features;
   wherein in the step S2, obtaining the multi-sensor fusion features comprises the following step:

1) conducting classification of health states to the multi-sensor features by a tag assignor, judging fault diagnosis performance in the source domain and the target domain via cross-entropy loss;
wherein a function of the cross-entropy loss is:

$$L_C(x^s, y^s) = \frac{1}{n}\sum_{i=1}^{n^s}\sum_{k=1}^{K} l(y_i^s = k) \cdot \log C(F(x_i^s))_k \quad (1)$$

wherein $l(y_i^s=k)$ is an indicator function, $c(F(x_i^s)_k)$ is a kth value as predicted, and k is a number of health classification;
and where a final CBAM multi-sensor fusion module is:

$$M(F)=\sigma(W_1(W_0(F_{avg}^c)))+W_1(W_0(F_{max}^c)+\sigma(f^{n\times n}[F_{avg}^s; F_{max}^s]) \quad (2)$$

wherein σ is a sigmoid activation function, W is a weight of the full-connection neural network, and f^(n×n) is a convolutional operation with a convolutional kernel of n×n.

2. The cross-domain mechanical fault diagnosis method based on multi-channel feature fusion of the CBAM according to claim 1, wherein in the step (1), obtaining the bearing vibration signals under different working conditions and health states, is performed using a sampling frequency of 12800 Hz; and
in the step (2), obtaining the untagged target domain dataset by not generating a tag set for target domain data.

3. The cross-domain mechanical fault diagnosis method based on multi-channel feature fusion of the CBAM according to claim 1, wherein in the step S3, inputting the multi-sensor fusion features into a tag assignor and obtaining the fault diagnosis result, comprising, conducing global feature alignment for cross-domain features employing Wasserstein distance after completing extraction of the multi-sensor fusion features, and realizing cross-domain signal feature transfer learning in combination with a domain adaption mechanism.

4. The cross-domain mechanical fault diagnosis method based on multi-channel feature fusion of the CBAM according to claim 3, wherein
conducting global feature alignment for the cross-domain features employing Wasserstein distance and realizing cross-domain signal feature transfer learning in combination with the domain adaption mechanism comprises the following steps:

(i) aligning different domain features utilizing a domain adversarial mechanism:

$$L_D = \frac{1}{n^s}\sum_{i=1}^{n^s} E_{x^s\sim p_r} D(F(x_i^s)) + \frac{1}{n^t}\sum_{j=1}^{n^t} E_{x^t\sim P_g} D(F(x_j^t)) \quad (3)$$

(ii) learning domain-invariant features with a domain difference assessment block, aligning the multi-sensor features of the health states of different devices, alleviating domain differences and outputting aligned loss, as per a following equation:

$$L_{wd} = \left| \frac{1}{n^s}\sum_{i=1}^{n^s} h_i^s - \frac{1}{n^t}\sum_{i=1}^{n^t} h_j^t \right| \quad (4)$$

wherein hi and h are output of the feature extractor;
(iii) combining the equation (1), the equation (2), the equation (3) and the equation (4) and obtaining a total loss function as following:

$$L(\theta_F,\theta_C,\theta_D)=\gamma L_C+\beta L_{wd}+\lambda L_D \quad (5)$$

in the function, Y, α, and β are respectively weighting parameters of balanced loss $L_c$, $L_{wd}$ and $L_D$; and
(iv) a testing process comprising inputting test data in the target domain into a cross-domain mechanical fault model based on multi-channel feature fusion of the CBAM and outputting classification results.

5. A test platform, wherein the test platform is configured to implement the cross-domain mechanical fault diagnosis method based on multi-channel feature fusion of the CBAM according to claim 1, wherein the test platform comprises at least one motor, at least one transmission shaft, at least one bearing seat, at least one loading device and at least one planetary gear box; and the test platform is configured to acquire vibration signals and acoustic signals under different working conditions of bearings in different health states and make intelligent fault diagnosis.

6. A computer device, wherein the computer device comprises a storage memory and a processor, a computer program is stored in the storage memory, and the computer program when executed by the processor will have the processor to execute the cross-domain mechanical fault diagnosis method based on multi-channel feature fusion of the CBAM according to claim 1.

7. A non-transitory computer readable storage medium, wherein a computer program is stored in the computer readable storage medium, and the computer program when executed by a processor, will have the processor to execute the cross-domain mechanical fault diagnosis method based on multi-channel feature fusion of the CBAM according to claim 1.

* * * * *